July 5, 1932. H. R. SAGE 1,866,059
PLANT PROTECTOR
Filed April 4, 1932
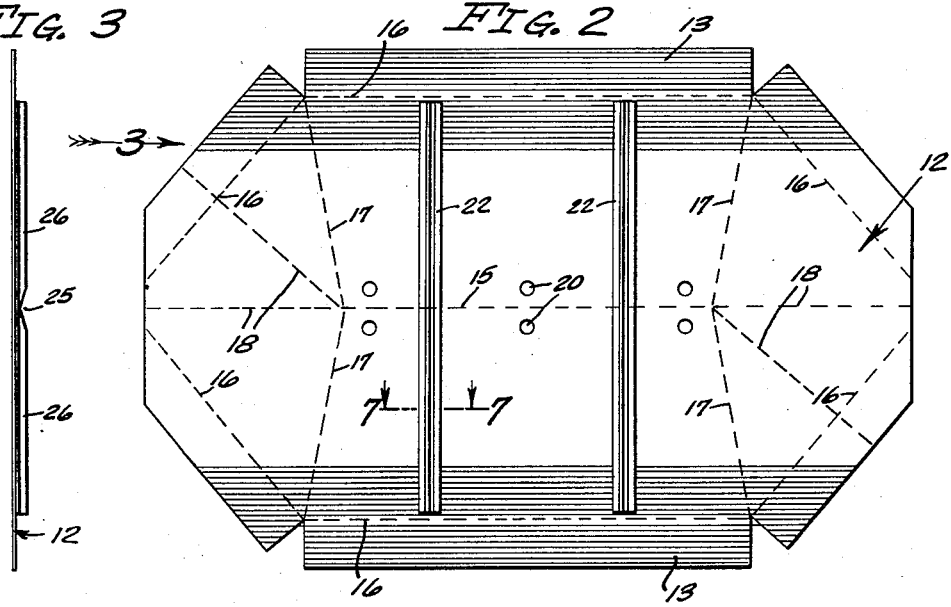
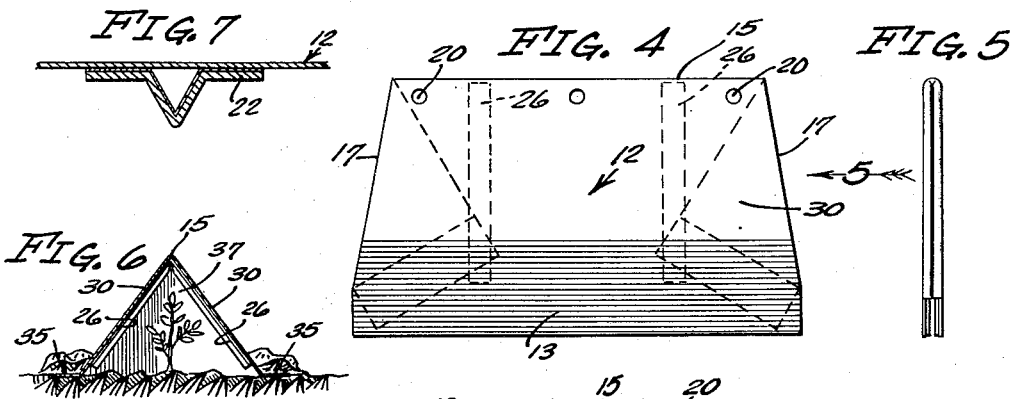
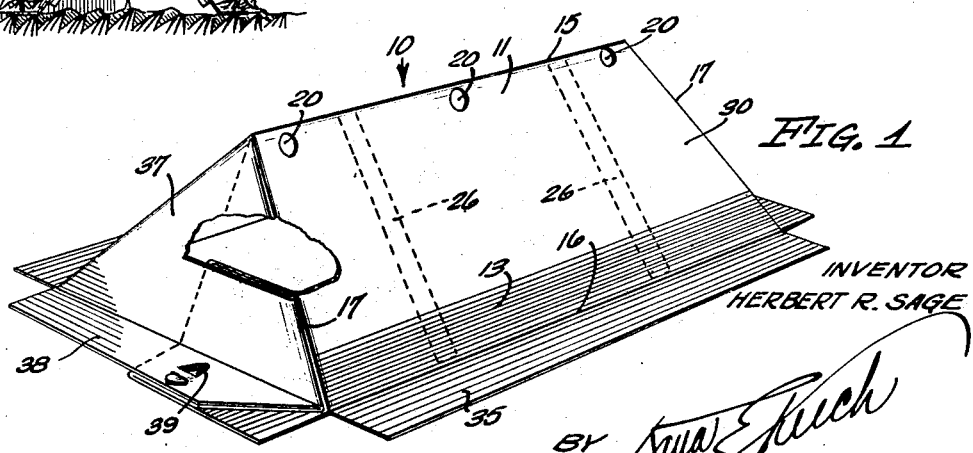
INVENTOR
HERBERT R. SAGE
BY
ATTORNEY Patented July 5, 1932

1,866,059

UNITED STATES PATENT OFFICE

HERBERT R. SAGE, OF LOS ANGELES, CALIFORNIA

PLANT PROTECTOR

Application filed April 4, 1932. Serial No. 603,018.

My invention relates to plant protectors and particularly to such protectors as are formed of paper and the like.

It is common practice to plant garden truck under paper protectors to promote early maturing of a portion of the crop. This portion can then be sold at the higher prices prevailing just previous to the opening of the regular marketing season.

The theory upon which these protectors work is for each protector to form a miniature hot house which maintains relatively uniform atmospheric conditions in the immediate vicinity of the plant, particularly while the latter is young and needs protection from the weather.

To supply the required protection from rain, hail, snow, frost and high winds, these paper protectors must be waterproof and must be rigidly supported to prevent their being beaten down to the earth thereby smothering and destroying the plant they are intended to protect.

The waterproofing is usually supplied by waxing the paper, though in some instances glassine is used instead of waxed paper to supply this quality. Structural strength is attained in a number of ways, some protectors being hand formed at the time of installation over bent twigs or wires stuck in the ground as a framework. Other protectors are die formed when manufactured so as to have a definite shape which is retained, after installed, for a period which varies in length depending upon the degree of destructiveness manifested by the weather.

It is an object of my invention to provide a paper plant protector which has within its own structure a much greater capacity to resist inclement weather conditions than is possessed by the strongest preformed, all-paper plant protector hitherto produced.

One of the difficulties not as yet eliminated from paper plant protectors hitherto in general use is the tendency of moisture to collect in droplets on the inner surfaces of these protectors and remain there throughout the day even when it is fairly hot. This results in maintaining a condition of excessive humidity beneath the protector which damages the plant, often causing it to die and decay during the period it is being sheltered from the outside weather.

It is an object of my invention to provide a paper plant protector which will resist outside weather conditions, but which will not cause an excessive humidity within the protector.

It is the general practice to install a plant protector over a hill of seed at the time these are planted, the protector being retained in place by earth piled on edge portions of the protector. It is also customary to remove the protector in a few days, thin out the plants which have sprouted up, and replace the protector. It has been found that edge portions of the protectors hitherto offered on the market rot off in the soil by the time of this thinning so that the original protector must include extra material permitting it to be buried farther in the soil when installed the second time, or be replaced with a new protector.

Accordingly, it is another object of my invention to provide a paper plant protector, edge portions of which are adapted to withstand attacks by decay causing organisms, thus permitting the replacing of the same protector after thinning the plants without a decrease in the useful size of the protector.

Plant protectors previously in general use have been made transparent so that as much light as possible would be transmitted to the plant. My experiments have showed that this has contributed considerably to the excessively humid condition found under these protectors on warm days. I have found that these humid conditions were much aggravated by excessive evaporation of moisture from the soil under the protector and that this evaporation resulted in a large measure from the yellow and red rays of the spectrum being admitted to the interior of the protector.

It is, therefore, another object of my invention to provide a paper plant protector which will reduce evaporation from the soil about the plants by excluding yellow and red light rays from contacting this soil.

In my experiments with plant protectors as light filters, I have discovered that it is possible to greatly accelerate the rate of growth of plants under a protector by impregnating the protector with a pigment of a color within a certain range of the spectrum. I found the most stimulating color on plant growth to be a deep blue, while green is somewhat less stimulating though very effective.

It is another object of my invention to provide a paper plant protector which is treated so as to constitute an inexpensive light filter for stimulating the growth of plants covered thereby.

My use of blue plant protectors has taught me that though it is advantageous to use this color while the seeds are sprouting, it causes too rapid maturing of the plant if the latter is subjected to this color longer than a few days.

Accordingly, it is a further object of my invention to provide a plant protector having a color in the bluish series of the spectrum, which color changes within a few days after the protector is set out, to a color which is substantially less stimulating to plant growth.

Hitherto paper plant protectors have not attained a very considerable degree of structural rigidity without the use of metal frames which must be gathered up after each planting and scrapped. This, of course, constitutes a nuisance as well as a considerable item of expense to the farmer.

A still further object of my invention therefore is to provide a plant protector which will strongly resist adverse weather conditions, and yet which is formed entirely of fibrous material, preferably paper, so that it will entirely disintegrate in the soil during the season in which it is used.

In my co-pending applications for U. S. Letters Patents, Serial Nos. 534,855, and 537,887, filed respectively on the 4th and 16th days of May, 1931, I disclose two types of plant protectors, the first being substantially conical in form, and the second being in the form of a ridgepole tent having flat sides.

While the present invention relates to plant protectors in general, it is one of its objects to provide an improved type of plant protector having flat sides as disclosed in the latter of my above noted co-pending applications.

The manner of accomplishing the foregoing objects, as well as further objects and advantages, will be made manifest in the following description taken in connection with the accompanying drawing, in which:

Fig. 1 is a perspective view of a preferred embodiment of my invention partly broken away to illustrate the construction thereof.

Fig. 2 is a bottom plan view of the protector of my invention when spread out flat.

Fig. 3 is a side elevational view of Fig. 2 taken in the direction of the arrow 3.

Fig. 4 is a side elevational view of the protector of my invention collapsed for shipping.

Fig. 5 is an end elevational view of Fig. 4 taken in the direction of arrow 5.

Fig. 6 is a cross sectional view of the protector of my invention illustrating the manner of its use.

Fig. 7 is an enlarged cross sectional view taken on the line 7—7 of Fig. 2, and illustrating the structure of the rafters of the invention.

Referring specifically to the drawing, the preferred embodiment of the invention illustrated therein comprises a plant protector 10, the principal component of which is a cover 11 which is preferably formed of paper or the like. My experiments have shown that the best results are had when using an unbleached butcher's sulphite paper of about 40 lbs. weight. In the manufacture of the device 10, this paper is fed from a roll through a suitable device which saturates opposite edge portions thereof with a treating agent which substantially proofs this portion of the paper against the most active decay causing organisms found in the soil. I have found that the most suitable thing for this purpose is a solution of bluestone in ammonia of about 26° Bé. gravity.

After the treating of edge portions of the paper stock in this manner, the paper is dried and is then passed through a bath of light mineral oil, preferably a colorless oil. This is for the purpose of rendering the paper waterproof. As one of the features of the present invention is the impregnation of the cover 11 with a suitable color, I prefer to apply this color in connection with the oil bath, and for this purpose dissolve the coloring matter in this oil. My experiments have shown that Prussian blue is the most suitable color for use in this connection, and accordingly I form a solution of Prussian blue in turpentine and then mix this with the oil.

After the oil bath in which the above described mixture of oil and color solution is applied to the paper stock, the excess of this mixture is removed by rolling the stock between a pair of rollers and the stock is then dried by passing it over a number of spaced rollers and then wound up into rolls again.

After the paper stock of the covers 11 has been treated as above described, this paper is fed through a machine which cuts the paper into blanks 12 which are shaped as shown in Fig. 2. The shaded areas 13 indicate the portion of the paper which was rot-proofed in the first step of the process.

The blank 12 is now creased, as indicated by broken lines in Fig. 2, to provide a ridge crease 15, anchor flap creases 16, corner creases 17, and end flap folding creases 18. At this time holes 20 are also preferably punched in the blank 12 as shown in Fig. 2. The blank is now flattened out and reinforcing members 22 are cemented to the underface of the blank 12. These reinforcing members are disposed transversely of the ridge crease 15, and the ends of these members are disposed substantially at the anchor flap creases 16. Members 22 are preferably formed of heavy glue-sized tape, the paper of which is of approximately 90 lbs. weight, this tape being run through a forming device to give it a cross section as shown in Fig. 7, that is, in the form of a V.

After being thus formed members 22 are applied to the blank 12 with a water-proof adhesive such as casein glue. Indentations 25 are now formed medially in the members 22 so as to divide each of these into two rafters 26, as shown in Fig. 3.

The blank 12 is now folded along its creases 15, 16, 17, and 18 to form the protector 10 as shown in Fig. 1. This folding is seen to produce flat, sloping sides 30 which are framed by the ridge crease 15, the anchor flap creases 16, and the corner creases 17. These sides are also strongly reinforced by the paper rafters 26 shown by dotted lines in Fig. 1. The creases 16 forming side anchor flaps 35 fall entirely within the rot-proof areas 13.

Also provided by folding the blank 12 in this manner are tent ends 37, the lower portions of which are folded outwardly to provide end anchor flaps 38, the various folds in the ends being secured together as by stitches 39 formed in the paper itself. It is to be noted in Fig. 1 that the rot-proofed areas 13 extend almost to the middle of the end anchor flaps 38.

After thus being made up, the plant protector 10 is adapted to be folded, as shown in Figs. 4 and 5, so as to take up a very small space when shipped.

In using the plant protector 10 of my invention, it is placed on the ground, unfolded as shown in Fig. 1 over a planting of seeds or small plants and the anchor flaps 35 and 38 are covered with earth as shown in Fig. 6 so as to securely anchor the protector in place. Under the influence of the blue color, the plants underneath this protector will grow at a much more rapid rate than when under ordinary white light. The growth of the plants, however, is so stimulated by this blue light that it is not practical to keep the plants under this light until maturing. As mentioned hereinabove, my experiments have shown that after a few days under this light it is advisable to change the color of the light applied to the plant to a less stimulating color. In my plant protector, this is accomplished by a chemical action of the light on the ingredients of the paper treating mixture so as to change the blue color in a few days to a bluish green, the latter color being much less stimulating to the plant. I have found in my experiments that the bluish green, to which the original blue changes, is an excellent light to promote rapid growth of the plant after the initial sprouting.

It is an important advantage of my plant protector that the cover 11 of my plant protector is rendered water-proof by the oil bath while the paper remains porous. Thus, water particles condensing on the inner face of this cover, under conditions where water will evaporate from the outer surface of the cover, pass through the cover much in the same manner as through a blotter so that this water evaporates from the outer surface of the cover leaving the inner face of the cover dry. At the same time the cover 11 of my protector is water-proof so that it will stand rain without wilting. The porous feature of my plant protector prevents a condition of excessive humidity taking place inside the protector. All the former plant protectors which have enjoyed wide use have been formed either of waxed paper or glassine, and these protectors, while satisfactory in many ways, collect and retain drops of moisture inside the protector with the harmful effect on the plants already mentioned.

In regard to the rot-proofing, it will also be readily seen that the protector 10 may be left in place and removed and replaced for the necessary period of plant protection without loss of the anchor flaps by rotting. This, of course, is due to the resistance of the paper portions 13 to the mold spores present in the earth.

While no distinct theory is advanced as to the cause of the change in color mentioned hereinabove, it is conceived possible that the sulphur content of the paper used in forming the covers of my plant protector combines in the presence of sunlight with certain other ingredients of the water-proofing mixture to convert the Prussian blue into a bluish-green pigment. It also might be noted that the most successful kind of Prussian blue used in the construction of my device is Prussian blue which is ground in Japan. From a microscopic examination of a cross section of the paper cover of my plant protector, after this has been treated by the water-proofing and coloring mixture, it is seen that the coloring matter appears to be localized on the surface of the paper so that relatively small amounts of the color pass into the interior of the paper. The oil, of course, penetrates entirely through the paper and renders it water-proof. The failure of the color to permeate the structure of the paper is believed to explain the porous nature of the paper after the coloring matter has been applied. While it is possible to produce the plant protector of my invention by treating merely the outer surface of the cover paper, it is preferable to treat both sides of this paper with the water-proofing and coloring mixture.

What I claim is:

1. In a plant protector, the combination of: a single piece of paper having an upward ridge crease forming two substantially flat sloping roof sides meeting at said crease; earth-anchor flaps provided along the outer edges of said roof sides by straight longitudinal downward creases in said paper; roof ends formed upon said roof sides by creases in end portions of said piece of paper; and a plurality of relatively stiff rafters formed of fibrous material and applied to inner faces of said roof sides, said rafters under one roof side being flexibly related to those under the other roof side.

2. In a plant protector, the combination of: a single piece of paper having an upward ridge crease forming two substantially flat sloping roof sides meeting at said crease; earth-anchor flaps provided along the outer edges of said roof sides by straight longitudinal downward creases in said paper; roof end walls formed upon said roof sides by creases in end portions of said piece of paper; anchor flaps provided along lower edges of said end walls by straight downward creases in end portions of said paper; and a plurality of relatively stiff rafters formed of fibrous material and applied to inner faces of said roof sides, said rafters under one roof side being flexibly related to those under the other roof side.

3. In a plant protector, the combination of: a blank of relatively light paper or the like adapted to be shaped into a tent; and a plurality of relatively heavy paper rafters deformed transversely to form a stiffening portion extending away from said blank, said rafters being cemented to said blank in parallel relation.

4. In a plant protector, the combination of: a blank of relatively light paper or the like adapted to be shaped into a tent; and a plurality of paper rafters sharply creased longitudinally to render these stiff, and cemented to said blank in parallel relation with a weatherproof cement which retains its adhesive qualities under weather conditions of relatively high temperature.

5. In a plant protector, the combination of: a blank of relatively light paper or the like adapted to be shaped into a tent; and a plurality of paper rafters sharply creased longitudinally to give them a V cross section, said rafters being cemented to said blank with their open faces disposed thereagainst to maintain said rafters in their creased condition, the cement used being of a waterproof nature and adapted to retain its adhesive qualities under weather conditions of relatively high temperature.

6. In a plant protector, the combination of: a blank of relatively light paper or the like adapted to be shaped into a tent; and a plurality of relatively heavy paper rafters cemented to said blank in parallel relation, there being a ridge crease formed in said blank and extending across said rafters, the latter being weakened at said crease.

7. A plant protector formed from paper in the shape of a cap, tent or the like, said paper being both porous and waterproof by virtue of waterproofing applied to individual fibers of the paper, the spaces between said fibers being left open.

8. A plant protector formed from paper in the shape of a cap, tent, or the like, said paper being both porous and waterproof, a ground contacting portion thereof being impregnated with a rot proofing solution to render said portion proof against attack by certain decay forming organisms.

9. A plant protector formed of paper so that edge portions thereof are adapted to be buried in the ground to hold the protector in place, certain of said edge portions being impregnated with a rot proofing solution to protect them for a period of time against being attacked by certain decay forming organisms.

10. A plant protector formed of paper and embodying a coloring material from among the violet to green series of the spectrum pigment of said coloring material being adapted to diminish in intensity relatively rapidly under the influence of the sun.

11. A plant protector formed of porous paper treated to render it waterproof without destroying its porosity and embodying a coloring material from among the violet to green series of the spectrum, the pigment of said coloring material being adapted to diminish in intensity relatively rapidly under the influence of the sun.

12. A plant protector formed of paper and impregnated with a bluish pigment, the latter being adapted to fade to a greenish color within a few days when exposed to bright sunlight.

13. A plant protector formed of porous paper and impregnated with a relatively pure mineral oil mixed with a solution of Prussian blue, the excess of said mixture being removed from said paper permitting its porosity to be retained.

14. A plant protector formed of porous paper and impregnated with a relatively pure mineral oil mixed with a solution of Prussian blue in turpentine, the excess of said mixture being removed from said paper permitting its porosity to be retained.

15. A plant protector including a tent-like cover formed of paper with sloping sides, and rafters formed of relatively heavy paper creased and secured to inner faces of said sides so that each of said rafters is capable of withstanding a bending force of over ten ounces applied to its middle while said rafter is supported at its ends.

16. A plant protector including a tent-like cover formed of paper with flat sides meeting at a ridge crease in said cover, said sides having anchor flaps formed by creases from lower edges thereof, and paper reinforcing members provided on said sides to extend from said ridge crease down to said anchor flaps, one of said members being capable of withstanding a bending force of over ten ounces applied inwardly at a midpoint thereon.

17. A plant protector tent formed from a single sheet of paper by providing an upward ridge crease centrally therein, downward creases along outer edges thereof and outward end creases therein, said creases acting as quadrilateral frames for flat sloping sides bounded thereby, the end material between respective pairs of said end creases being folded together to form end walls.

18. A combination as in claim 17 in which said end walls have horizontal creases substantially on the same level as said side creases.

19. A combination as in claim 17 in which a plurality of folds in said ends are secured together and said ends are then creased inwardly to permit said tent to be collapsed with the side walls thereof being brought into close parallel relation.

20. In a plant protector, the combination of a blank of relatively light paper or the like adapted to be shaped into a tent; and a plurality of paper rafters formed with a longintudinal rib and cemented to said blank.

21. In a plant protector, the combination of: a blank of relatively light paper or the like adapted to be shaped into a tent; and a plurality of paper rafters sharply creased longitudinally to give them a V cross section, said rafters being cemented to said blank with their open faces disposed thereagainst to maintain said rafters in their creased condition.

In testimony whereof, I have hereunto set my hand at Los Angeles, California, this 30 day of March, 1932.

HERBERT R. SAGE.